(12) United States Patent
Curatolo et al.

(10) Patent No.: US 6,510,380 B1
(45) Date of Patent: Jan. 21, 2003

(54) SECURITY AND TRACKING SYSTEM

(75) Inventors: Benedict S. Curatolo, Valley View, OH (US); Thomas E. Cornelius, Sagamore Hills, OH (US)

(73) Assignee: C2 Global Technologies, Inc., Sagamore Hills, OH (US)

( * ) Notice: Subject to any disclaimer, the term of this patent is extended or adjusted under 35 U.S.C. 154(b) by 0 days.

(21) Appl. No.: 09/538,193

(22) Filed: Mar. 30, 2000

Related U.S. Application Data

(60) Provisional application No. 60/127,028, filed on Mar. 31, 1999.

(51) Int. Cl.[7] .............................. G01S 5/02; G01C 21/28; G01C 21/36
(52) U.S. Cl. .................. 701/207; 342/357.07; 342/357; 342/196; 342/357.06; 701/200–206; 701/208–215; 340/572.1; 340/572.4; 340/825.54; 340/573; 340/988; 340/989; 340/990; 340/426; 600/300; 600/309; 600/481
(58) Field of Search .......................... 342/357.07, 357, 342/457, 196, 357.06, 357.09, 357.01; 701/200–215; 340/572.1, 572.4, 572.7, 572.8, 825.54, 573, 988, 989, 990, 426, 539; 128/639, 734, 903; 600/300, 309, 481; 343/713, 846, 848; 455/511, 422, 419, 410, 403; 174/35 R; 29/856

(56) References Cited

U.S. PATENT DOCUMENTS

| | | | |
|---|---|---|---|
| 4,694,284 A | 9/1987 | Leveille et al. | 340/573 |
| 4,744,083 A | 5/1988 | O'Neill et al. | 371/22 |
| 4,799,062 A | 1/1989 | Sanderford, Jr. et al. | 342/457 |
| 4,818,998 A | 4/1989 | Apsell et al. | 342/457 |
| 4,819,860 A | 4/1989 | Hargrove et al. | 340/573 |
| 4,839,656 A | 6/1989 | O'Neill et al. | 342/357 |
| 4,885,571 A | 12/1989 | Pauley et al. | 340/573 |
| 4,918,432 A | 4/1990 | Pauley et al. | 340/573 |
| 4,952,913 A | 8/1990 | Pauley et al. | 340/573 |
| 4,965,586 A | 10/1990 | O'Neill et al. | 342/357 |
| 5,021,794 A | 6/1991 | Lawrence | 342/457 |
| 5,027,314 A | 6/1991 | Linwood et al. | 340/573 |
| 5,189,395 A | 2/1993 | Mitchell | 340/573 |
| 5,196,825 A | 3/1993 | Young | 340/573 |
| 5,204,670 A | 4/1993 | Stinton | 340/573 |
| 5,218,344 A | 6/1993 | Ricketts | 340/573 |
| 5,223,844 A * | 6/1993 | Mansell et al. | 342/357 |
| 5,225,809 A | 7/1993 | Bunn | 340/574 |
| 5,225,842 A | 7/1993 | Brown et al. | 342/357 |
| 5,255,306 A | 10/1993 | Melton et al. | 340/573 |
| 5,266,944 A | 11/1993 | Carroll et al. | 340/573 |

(List continued on next page.)

Primary Examiner—William A. Cuchlinski, Jr.
Assistant Examiner—Ronnie Mancho
(74) Attorney, Agent, or Firm—Renner, Kenner, Greive, Bobak, Taylor & Weber

(57) ABSTRACT

A security and tracking apparatus is provided, comprising at least two signaling units in communicating proximity, and means for identifying the location of the signaling units. In one embodiment, a security and tracking apparatus is provided, comprising at least two signaling units in communicating proximity, and means for identifying and automatically transmitting the location of the signaling units when the signaling units are separated by more than a preselected distance. In a preferred embodiment, a method is provided to locate a person, an animal, or a material asset, comprising providing in contact with the person, animal, or material asset, at least two signaling units in communicating proximity, wherein at least one signaling unit is small and hidden and securely attached to the person, animal, or material asset, and the signaling units having means for identifying the location of the signaling units to a monitoring station; activating means for identifying the location of the signaling units by referencing the global positioning satellite (GPS) system; and notifying the monitoring station of said geographic location.

53 Claims, 1 Drawing Sheet

U.S. PATENT DOCUMENTS

Figure 1:
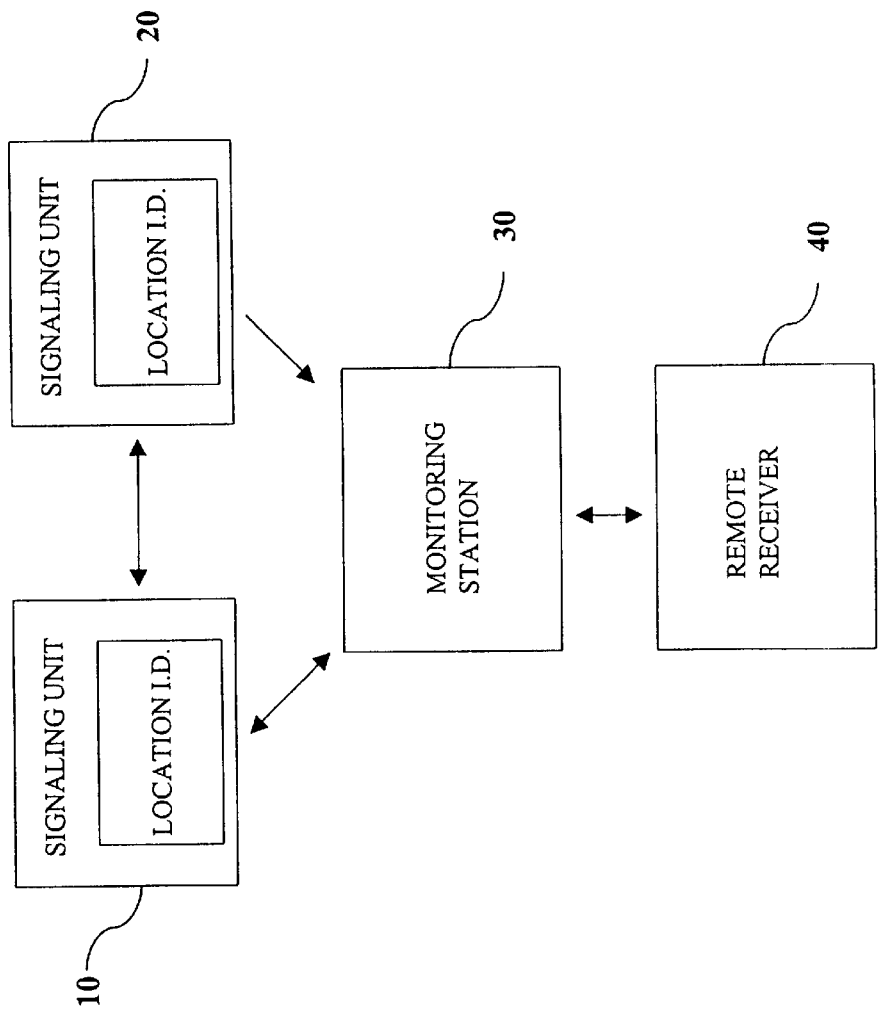

| | | | |
|---|---|---|---|
| 5,334,974 A | 8/1994 | Simms et al. | 340/990 |
| 5,337,041 A | 8/1994 | Friedman | 340/573 |
| 5,357,254 A | 10/1994 | Kah, Jr. | 340/573 |
| 5,396,227 A | 3/1995 | Carroll et al. | 340/573 |
| 5,408,238 A | 4/1995 | Smith | 342/357 |
| 5,461,365 A | 10/1995 | Schlager et al. | 340/573 |
| 5,461,390 A | 10/1995 | Hoshen | 340/573 |
| 5,479,482 A | 12/1995 | Grimes | 455/556 |
| 5,485,163 A | 1/1996 | Singer et al. | 342/457 |
| 5,512,879 A | 4/1996 | Stokes | 340/573 |
| 5,515,419 A | 5/1996 | Sheffer | 340/539 |
| 5,525,967 A | 6/1996 | Azizi et al. | 340/573 |
| 5,559,520 A | 9/1996 | Barzegar et al. | 342/357 |
| 5,589,818 A | 12/1996 | Queen | 340/573 |
| 5,597,335 A | 1/1997 | Woodland | 441/36 |
| 5,621,388 A | 4/1997 | Sherburne et al. | 340/573 |
| 5,629,678 A | 5/1997 | Gargano et al. | 340/573 |
| 5,640,146 A | 6/1997 | Campana, Jr. | 340/573 |
| 5,640,147 A | 6/1997 | Chek et al. | 340/573 |
| 5,650,769 A | 7/1997 | Campana, Jr. | 340/573 |
| 5,650,770 A | 7/1997 | Schlager et al. | 340/573 |
| 5,686,892 A | 11/1997 | Smith | 340/572 |
| 5,708,421 A | 1/1998 | Boyd | 340/573 |
| 5,724,025 A * | 3/1998 | Tavori | 340/573 |
| 5,731,785 A | 3/1998 | Lemelson et al. | 342/357 |
| 5,742,233 A | 4/1998 | Hoffman et al. | 340/573 |
| 5,781,150 A | 7/1998 | Lemelson et al. | 342/357 |
| 5,793,813 A * | 8/1998 | Cleave | 342/352 |
| 5,857,433 A | 1/1999 | Files et al. | 119/720 |
| 5,868,100 A * | 2/1999 | Marsh | 119/421 |
| 6,008,727 A * | 12/1999 | Want et al. | 340/572.1 |
| 6,067,045 A * | 5/2000 | Castello et al. | 342/357.09 |
| 6,113,539 A * | 9/2000 | Ridenour | 600/300 |
| 6,144,859 A * | 11/2000 | LaDue | 455/511 |
| 6,184,801 B1 * | 2/2001 | Janky | 340/988 |
| 6,236,836 B1 * | 5/2001 | Westman et al. | 340/991 |
| 6,259,399 B1 * | 7/2001 | Krasner | 342/357.06 |
| 6,317,049 B1 * | 11/2001 | Toubia et al. | 340/539 |

* cited by examiner

SECURITY AND TRACKING SYSTEM

CROSS REFERENCE TO RELATED APPLICATIONS

This application claims priority under 35 USC 119(e) from U.S. Provisional Patent Application Serial No. 60/127,028 filed on Mar. 31, 1999.

FIELD OF THE INVENTION

This invention is directed to a security and tracking system and apparatus, and a method used to in identify the location of an individual in an emergency situation, the location of a missing animal, or the location of a missing material asset.

BACKGROUND OF THE INVENTION

There is a recognized need for improved personal security and emergency response capability. In situations where an individual is injured, lost, or abducted, immediate notification of an emergency situation to a local law enforcement or emergency response organization is required to maintain the safety of the individual and to avoid tragic circumstances.

Today's technology provides automatic identification of caller locations in emergency situations via wireline telephone companies. With this technology, a caller dials a 911 telephone number, and a computer accesses the caller's number in a street directory. This technology currently falls short in the case of wireless communications and in situations where there is no phone available. The importance of emergency response is demonstrated by the FCC mandate, in two phases, of Wireless 911 for the identification of a relevant public safety answering point. This mandate still falls short of necessary safety requirements in situations of abduction or kidnapping, physical or mental incapacitation, and other emergency situations remote from available wireless communications. These situations require a security and tracking apparatus that is not limited in range and is able to automatically identify the location of an individual in an emergency situation.

The prior art describes a variety of alarms and tracking systems, all of which suffer from at least two fundamental deficiencies. These systems are exemplified by U.S. Pat. No. 5,731,785 which describes a single signaling unit carried by an individual, object, or vehicle. If the signaling unit is separated from the individual, object, or vehicle, tracking is no longer possible and the system fails. Moreover, these systems fail to address the circumstances of individuals who are helpless in an emergency situation such as abduction or kidnapping, or physical or mental incapacitation.

The present invention is directed to providing, without geographic constraints, a security and tracking apparatus with overt and covert signaling units in communicating proximity on an individual, animal, or material asset, with a fully automated system to rapidly and reliably indicate location on demand and automatically upon removal of an overt signaling unit.

SUMMARY OF THE INVENTION

A security and tracking apparatus is provided, comprising a first signaling unit having means for identifying the location of said signaling unit, and a second signaling unit in communicating proximity with the first signaling unit, the second signaling unit having means for identifying the location of said second signaling unit.

In a preferred embodiment, the present invention provides a security and tracking system comprising a first signaling unit having means for identifying the location of said signaling unit, a second signaling unit in communicating proximity with the first signaling unit, the second signaling unit having means for identifying the location of said second signaling unit, and a monitoring station capable of receiving information identifying the location of the signaling units.

In another preferred embodiment, a method is provided to locate a person, animal, or object, comprising providing in contact with the person, animal, or object, at least two signaling units in communicating proximity, each said signaling unit having means for identifying the location of said signaling unit, and activating said means to identify the location.

DRAWING FIGURES

FIG. 1 is a schematic of a security and tracking system in accordance with an embodiment of the present invention.

DETAILED DESCRIPTION OF THE INVENTION

Referring to FIG. 1, the present invention is a security and tracking system comprising a first signaling unit 10 having means for identifying the location of said signaling unit; and a second signaling unit 20 in communicating proximity with the first signaling unit, said second signaling unit having means for identifying the location of said second signaling unit.

In one embodiment, the security and tracking system of the present invention includes means for transmitting the location of each signaling unit automatically when the signaling units are separated more than a preselected distance. To provide the greatest possible degree of security, it is necessary for the system to signal immediately and automatically in the case of an emergency situation. Examples of such situations include the removal of one of the associated signaling units from an individual in a kidnapping or abduction situation, theft of a material asset containing a signaling unit, and the like.

In another embodiment, the security and tracking system of the present invention includes means for receiving an initiating signal for activating the transmission of information identifying the location of the signaling units. This initiating signal may originate from a monitoring station 30 or other remote location. The security and tracking apparatus of the present invention, therefore, allows a parent or guardian to determine the location of an individual in their care if they discover that the individual is missing or may be in an emergency situation. Likewise, the owner of a pet or material asset may determine the location of the animal or material asset in the case of theft or loss. The transmission of information identifying the location of the signaling units may also be initiated by one of the signaling units, which is vital in a medical emergency or abduction situation, or by an independent signaling unit.

The signaling units of the present invention have numerous capabilities and options, including capabilities for analog or digital signal processing, transmitting, and receiving. Components of the signaling units may include, but are not limited to, a power source, an antenna, a receiver, a microprocessor, an electronic switch, a sensor, a signal generator, a timer circuit, and an optional microphone and video camera. The preferred power source is a battery, but power may also be supplied by other means, for example, by mechanical motion or a battery charger. The signaling units may contain a global positioning satellite (GPS) system antenna, and may also contain additional types of antennas, for example, a cellular telephone antenna, radio antenna, etc., depending on how information and data is desired to be exchanged with the Global Positioning System, the monitoring station, etc.

The signaling units may receive information via a GPS receiver processor, cellular telephone receiver, radio receiver, and the like. A microprocessor may be used to match and verify a code that uniquely identifies each signaling unit. Electronic switches, sensors, and timing circuits may be used for manual signals or to determine emergency situations for signaling, such as the absence of a periodic signal from a first signaling unit to a second signaling unit. The periodic signal may utilize radio waves, infrared technology, ultrasonic technology, mobile document application language (Modal) technology, software at the monitoring station, or any other known means. A manual switch is preferably configured to prevent accidental activation, for example, an internal switch or button that may be activated after opening a signaling unit, but which cannot be activated by accidental bumping. Signal generators may be any type of transmitter that can send a periodic signal to another signaling unit or an emergency signal to a monitoring station.

In one embodiment of the present invention, the means for identifying the location of the signaling units utilizes at least one of the group consisting of the global positioning satellite (GPS) system, low earth orbit satellites, geostationary satellites, other types of satellites, and a cellular network. Examples of low earth orbit satellites include, but are not limited to, the type specified for Motorola's Iridium system. Cellular networks continue to proliferate and the coverage of such networks also continues to increase, but some locations remain out of range of existing cellular networks. Complete coverage of all possible locations is desired, with use of more than one system preferred for purposes of redundancy and reliability. It is preferred for the means for identifying the geographical location of the signaling units to utilize the global positioning satellite (GPS) system.

The global positioning satellite (GPS) system is a space-based positioning, velocity, and time system that has three major segments: (1) space, (2) control, and (3) user. The GPS space segment is composed of 24 satellites in six orbital planes. The satellites operate in circular 20,200 km orbits at an inclination angle of 55 degrees with a 12-hour period. The spacing of satellites in orbit is arranged so that a minimum of five satellites are in view to users worldwide. Each satellite transmits on two band frequencies, 1575.42 MHz and 1227.6 MHz. The GPS control segment has five monitor stations which use a GPS receiver to passively track all satellites in view and thus accumulate ranging data from the satellite signals. The information from the monitor stations is processed at a master control station to determine satellite orbits and to update the navigation message of each satellite. This updated information is transmitted to the satellites via ground antennas, which are also used for transmitting and receiving satellite control information. The GPS user segment consists of antennas and receiver processors that provide positioning, velocity, and precise timing to users.

The GPS concept is predicated upon accurate and continuous knowledge of the spatial position of each satellite in the system with respect to time and distance from a transmitting satellite to the user. Each satellite transmits unique data which is periodically updated by a master control station based upon information obtained from five widely dispersed monitor stations. Each satellite continuously transmits a composite spread spectrum signal at 1227.6 and 1575.42 MHz. The GPS receiver makes time-of-arrival measurements of the satellite signals to obtain the distance between the user and the satellites. These distance calculations, together with range rate information, are combined to yield system time and the three dimensional position and velocity of the user with respect to the satellite system. A time coordination factor then relates the satellite system to Earth coordinates. The GPS system, therefore, is a space based positioning system that provides three dimensional position, velocity and time information to suitably equipped users anywhere on or near the surface of the Earth. The GPS system provides continuous worldwide three-dimensional coverage, and system capacity is unlimited.

The GPS system provides two services for position determination, standard positioning service (SPS) and precise positioning service (PPS). Accuracy varies with the capability of the user's equipment. The standard positioning service (SPS) is the standard specified level of positioning and timing accuracy that is available without qualification or restrictions to any user on a continuous worldwide basis. The accuracy of this service is established by the U.S. Department of Defense based on U.S. security interests, and provides on a daily basis at any position worldwide, horizontal positioning accuracy within 100 meters. The precise positioning service (PPS) is the most accurate positioning, velocity, and timing information continuously available worldwide from the basic GPS system. This service is limited to authorized United States and allied federal governments, authorized foreign and military users, and eligible civil users, and provides a predictable positioning accuracy of 22 meters horizontally and time interval accuracy within 90 nanoseconds. In another embodiment of the present invention, differential methods may be used to provide increased positioning accuracy.

In a preferred embodiment of the present invention, at least one signaling unit is adapted to be hidden. The present invention thus provides a sophisticated security apparatus which may contain both a covert component and an overt component. An overt component in a security system may be easily noticed and either circumvented or copied, and the real security lies in a covert component, which is not easily seen, recognized, or circumvented. In the present invention, at least one signaling unit is covert or hidden, and at least one signaling unit may be overt and not hidden. An overt unit is obvious and easily recognized, and a kidnapper or abductor would be expected to remove the unit and throw it away. In the case of prior art systems where the only signaling unit was overt, the unit itself could be tracked, but an individual separated from the unit would be lost once the unit was removed. In the present invention, a signal will be generated immediately when the associated signaling units are separated more than a preselected distance, and all signaling units are able to be tracked. This feature is extremely important, since an individual could be taken miles away within minutes of being abducted.

In an embodiment of the present invention where at least one signaling unit is adapted to be hidden, it is an advantage if the signaling unit is small. A small signaling unit allows it to be hidden more easily, and also allows the unit to be incorporated into a plurality of articles. A signaling unit of the present invention may be incorporated into a molded article, an extruded article, a sewn article, and the like. The incorporation of a signaling unit into an article may be effected by any known manual or automated manufacturing method. The mode of attachment of a signaling unit may also be an adhesive, preferably a pressure sensitive adhesive.

The signaling units of the present invention may be incorporated into a wearable article. Examples of a wearable article include, but are not restricted to, at least one of an article of clothing, a shoe, a watch, a wristband, a bracelet, an identification card, an article of jewelry, a hair accessory, eyeglasses, and an animal collar.

In a preferred embodiment of the present invention, at least one signaling unit is securely attached to an individual. A very important feature of the security and tracking apparatus of the present invention is its utility for personal security for children, individuals with physical disabilities, individuals with mental disabilities, for example, Alzheimer patients, individuals in wilderness areas, and any other individuals who might encounter an emergency situation. The signaling units of the present invention may be configured for secondary operations which may include, but are not limited to, receiving or transmitting video signals or audio signals, the monitoring of physiological functions in order to determine the presence of emergency situations, and the like. The security and tracking apparatus of the present invention can also aid in the apprehension of individuals responsible for abduction and kidnapping and, therefore, contribute to overall public safety.

In another embodiment of the present invention, at least one signaling unit is securely attached to an animal. The present invention has utility for the security and tracking of pets and may also be used with any other animal for any other purpose such as scientific study, the assurance of public safety, etc.

In another embodiment of the present invention, at least one signaling unit is securely attached to a material asset. A signal will be generated when a material asset containing a signaling unit is separated more than a preselected distance from an associated signaling unit which may be carried by the owner of the asset or kept in the desired location of the asset. Examples of material assets include, but are not limited to, a credit card, a wallet, a cellular phone, a pager, a motor vehicle, a boat, an aircraft, a television, a radio, a stereo, a tape player, a compact disc player, a camera, a movie camera, a computer, a printer, a laptop computer, a briefcase, a suitcase, a weapon, an article of clothing, an article of jewelry, and an article of artwork. Multiple signaling units may also be placed in various components of a material asset, for example in a cellular phone and stereo of a motor vehicle as well as in the motor vehicle itself, so that the individual components may be traced in the case of their separation, such as the stripping of a motor vehicle after theft. The security and tracking apparatus of the present invention can also aid in the apprehension of individuals responsible for the theft of the material asset and, therefore, contribute to overall public safety. The signaling units of the present invention may be configured for secondary operations which may include, but are not limited to, receiving or transmitting video signals or audio signals, the disabling of firearms which have been separated from their owners, and the disabling of motor vehicles which have been separated from their owners.

It is preferred for the signaling units to be in a passive mode when the signaling units are in close or communicating proximity. An active mode in the absence of an emergency situation would unnecessarily drain available power in signaling units containing batteries, so a passive mode is preferred in non-emergency situations.

The information identifying the geographical location of the signaling units may be transmitted continuously. In an emergency situation, a continuous signal transmitting information identifying location is expected to be most accurate. The availability of a continuous signal may be limited by available power. The information identifying the location of the signaling units may also be transmitted intermittently. An intermittent signal at appropriately short intervals can be used to conserve power.

In one embodiment of the present invention, the information identifying the location of the signaling units is provided in an encrypted form. For the ultimate in security, it may be important in certain situations to send information in encrypted form to prevent the information from being used by individuals such as thieves, kidnappers, etc. to compromise the safety of individuals, animals, or material assets that the security system is designed to protect.

In a preferred embodiment, the present invention is a security and tracking system comprising a first signaling unit 10 having means for identifying the location of said signaling unit, a second signaling unit 20 in communicating proximity with the first signaling unit, said second signaling unit having means for identifying the location of said second signaling unit, and a monitoring station 30 capable of receiving information identifying the location of said signaling units. The location of the signaling units will be transmitted to the monitoring station automatically when the signaling units are separated more than a preselected distance. In an additional embodiment, the monitoring station includes a means for transmitting information identifying the location of the signaling units from the monitoring station to a remote receiver 40. The location of the remote receiver may be the home or work address of a parent or guardian of an individual, the home or work address of the owner of a pet, the home or work address of the owner of a material asset, a missing child organization or other service organization, a newspaper publisher, a radio station, a television station, a law enforcement agency facility, a law enforcement vehicle, an emergency response vehicle, an emergency care facility, etc. In a preferred embodiment, the location of the remote receiver is one of a service organization, a law enforcement agency facility, a law enforcement vehicle, an emergency response vehicle, and an emergency care facility.

The means for identifying the location of the signaling units may involve the use of satellite systems such as the GPS system or low earth orbit satellites, radiolocation, cellular networks, or any other method known to those skilled in the art. The method by which the monitoring station receives information identifying the geographic location of the signaling units may involve the use of satellite systems, radio signals, television signals, telephone communications, cellular communications, internet communications, or any other communication means known to those skilled in the art. It is preferred to have systems in place to transmit information by more than one method to provide speed, accuracy, back-up, and reliability for the security system.

The means for transmitting information identifying the location of the signaling units from the monitoring station to a remote receiver may involve the use of satellite systems, radio signals, television signals, telephone communications, cellular communications, internet communications, or any other communication means known to those skilled in the art. It is preferred to have systems in place to transmit information by more than one method to provide speed, accuracy, back-up, and reliability for the security system.

In another preferred embodiment, the present invention is a method to locate a person, animal, or object, comprising providing in contact with the person, animal, or object, at least two signaling units in communicating proximity, each said signaling unit having means for identifying the location of said signaling unit, and activating said means to identify the location.

In one embodiment, the method of the present invention includes automatically activating the transmission of the location of the signaling units when the signaling units are separated more than a preselected distance. To provide the greatest possible degree of security, it is necessary for the location of the signaling units to be transmitted immediately and automatically in the case of an emergency situation. Examples of such situations include the removal of one of the associated signaling units from an individual in a kidnapping or abduction situation, theft of a material asset containing a signaling unit, and the like.

In another embodiment, the method of the present invention includes initiating the transmission of information identifying the location of the signaling units upon receiving instructions from a remote source. The transmission of information identifying the location of the signaling units may be activated by one of the signaling units or by a signal from a monitoring station. In an additional embodiment, at least one signaling unit is small and is hidden in a wearable article. A preferred method for obtaining the location of the signaling units utilizes the global positioning satellite (GPS) system.

In a preferred method of the present invention, the signaling units are operated in a passive mode when they are in close or communicating proximity. An active mode in the absence of an emergency situation would unnecessarily drain available power in signaling units containing batteries, so a passive mode is preferred in non-emergency situations. The information identifying the location of the signaling units may also be transmitted continuously. In an emergency situation, a continuous signal transmitting information identifying location is expected to be most accurate. The availability of a continuous signal may be limited by available power. The information identifying the location of the signaling units may also be transmitted intermittently. An intermittent signal at appropriately short intervals can be used to conserve power. The information identifying the location of the signaling units may also be provided in an encrypted form. For the ultimate in security, it may be important in certain situations to send information in encrypted form to prevent the information from being used by individuals such as thieves, kidnappers, etc. to compromise the safety of individuals, animals, or material assets that the security system is designed to protect.

In another preferred embodiment, the present invention is a method to locate a person, animal, or object, comprising providing in contact with the person, animal, or object, at least two signaling units in communicating proximity, each said signaling unit having means for identifying the location of said signaling unit, and activating said means to identify the location of the signaling units to a monitoring station. The location of the signaling units may be provided within an unlimited range.

In a more preferred embodiment, a method of the present invention provides for the transmission of the location of the signaling units from a monitoring station to a remote receiver. The location of the remote receiver may be the home or work address of a parent or guardian of an individual, the home or work address of the owner of a pet, the home or work address of the owner of a material asset, a missing child organization or other service organization, a newspaper publisher, a radio station, a television station, a law enforcement agency facility, a law enforcement vehicle, an emergency response vehicle, an emergency care facility, etc. In a preferred embodiment, the location of the remote receiver is one of a service organization, a law enforcement agency facility, a law enforcement vehicle, an emergency response vehicle, and an emergency care facility.

Additional information may also be transmitted to the remote receiver. For a security and tracking system for an individual, the additional information transmitted to the remote receiver could include, but is not limited to, the physical description of the individual, a picture of the individual, fingerprints, etc. For a security and tracking system for an animal, the additional information transmitted to the remote receiver could include, but is not limited to, the physical description of the animal, a picture of the animal, etc. For a security and tracking system for a material asset, the additional information transmitted to the remote receiver could include, but is not limited to, the physical description of the material asset, a picture of the material asset, a registration number, a serial number, etc. In the case of a motor vehicle, the description may include a picture of the vehicle and the make, model, year, color, and license plate number of the vehicle, etc.

In the present invention, the method for transmitting information identifying the geographical location of the signaling units from the monitoring station to a remote receiver may be accomplished using any known means of communication, which includes, but is not limited to, radio waves, a computer network such as the internet, a telephone network, a cellular network, television transmissions, and the like. In one embodiment, the information identifying the geographical location of the signaling units is transmitted from the monitoring station to a remote receiver using low earth orbit satellites or the global positioning satellite (GPS) system. In a preferred embodiment, multiple forms of communication are used to provide redundancy and back-up in the case of failure of one or more communication systems.

It is preferred for the monitoring station to have a continuous ability to transmit information to the remote system at any time. The monitoring station is preferably computer controlled with recording capability and automatic and direct communication links to identified remote receiver devices which may be in the possession of individuals such as a parent or guardian in the case of a security system for an individual, an owner in the case of a security system for an animal or material asset, or at the location of a service organization, for example, a missing child organization, and emergency and law enforcement agencies in the geographic vicinity of the signaling units. The monitoring station may optionally employ human operators, and may, as described above, transmit additional information to the remote receiver.

In one embodiment of the present invention, the geographical location of the signaling units is identified with an accuracy of about 100 meters. In a preferred embodiment, the geographical location of the signaling units is identified with an accuracy of about 22 meters, or, more preferably, an accuracy of a few meters.

The signaling units of the present invention are not limited in geographic range from the monitoring station. Any restriction in geographic range, as in prior art security systems, would limit the effectiveness of the security apparatus. Through the utilization of the GPS system and other systems, the security and tracking apparatus of the present invention is able to perform without geographic range restrictions.

The following examples illustrate security and tracking systems and apparatus in accordance with the present invention.

EXAMPLE 1

A security and tracking apparatus is assembled with two small signaling units incorporated into (1) a medical bracelet and (2) a wallet for an Alzheimer's patient. The signaling units each contain a battery power supply, a GPS antenna, a GPS receiver processor, a radio antenna, a radio receiver, and a radio transmitter. Upon a telephone request from the caregiver of the patient, a monitoring station sends a radio signal to the signaling units instructing the units to identify their geographical location. The signaling units receive the radio instructions from the monitoring station, send signals to the global positioning satellite (GPS) system, and receive return signals from the GPS identifying their geographical locations. Radio signals are then sent from the signaling units to the monitoring station identifying their geographic locations. The locations of the units are transmitted from the monitoring station to the caregiver via telephone communication.

EXAMPLE 2

A security and tracking apparatus is assembled with two small signaling units incorporated into (1) a medical bracelet and (2) a wallet for an Alzheimer's patient. The signaling units each contain a battery power supply, a GPS antenna, a GPS receiver processor, a radio antenna, a radio receiver, a radio transmitter, a cellular telephone antenna, a cellular telephone receiver, and a cellular telephone transmitter. The first signaling unit sends a periodic radio signal to the second signaling unit. Upon loss of the wallet, the two signaling units are separated more than a predetermined distance, and the periodic radio signal from the first signaling unit is no longer received by the second signaling unit. The loss of the periodic signal causes each signaling unit to automatically send a signal to the global positioning satellite (GPS) system and receive a return signal from the GPS identifying its geographical location. A cellular telephone signal is automatically sent from each signaling unit to the monitoring station identifying its geographic location. The location of each unit is transmitted by telephone communication from the monitoring station to the caregiver of the patient and to a law enforcement agency in the geographic vicinity of the two signaling units (the lost wallet and the patient wearing the medical bracelet).

EXAMPLE 3

A security and tracking system is assembled, comprising two small associated signaling units incorporated into a visible wristwatch and a hidden ankle bracelet on a child, and a monitoring station capable of sending transmissions to and receiving transmissions from the signaling units. The signaling units each contain a battery power supply, a GPS antenna, a GPS receiver processor, and an antenna, receiver, and transmitter capable of communication with low earth orbiting satellites. Upon a telephone request from the parent or guardian of the lost child, the monitoring station sends a signal to the signaling units via low earth orbiting satellites instructing the units to identify their geographical location. The signaling units receive the instructions from the monitoring station, send signals to the global positioning satellite (GPS) system and receive return signals from the GPS identifying their geographical locations, and transmit this information to the monitoring station via low earth orbiting satellites. The locations of the units are transmitted via cellular communication from the monitoring station to the parent or guardian and to a law enforcement agency in the geographic vicinity of the signaling units, and a video picture and description of the child is also transmitted to the law enforcement agency.

EXAMPLE 4

A security and tracking system is assembled, comprising two small associated signaling units incorporated into a visible wristwatch and a hidden ankle bracelet on a child, and a monitoring station capable of sending transmissions to and receiving transmissions from the signaling units. The signaling units each contain a battery power supply, a GPS antenna, a GPS receiver processor, a radio antenna, a radio receiver, a radio transmitter, a cellular telephone antenna, a cellular telephone receiver, and a cellular telephone transmitter. The first signaling unit sends a periodic radio signal to the second signaling unit. Upon abduction of the child, the abductor removes the wristwatch, the two signaling units are separated more than a predetermined distance, and the periodic radio signal from the first signaling unit is no longer received by the second signaling unit. The loss of the periodic signal causes each signaling unit to automatically send a signal to the global positioning satellite (GPS) system and receive a return signal from the GPS identifying its geographical location. A cellular telephone signal is automatically sent from each signaling unit to the monitoring station identifying its geographic location. The location of each unit is transmitted by telephone communication from the monitoring station to the parent or guardian of the child and to a law enforcement agency in the geographic vicinity of the two signaling units (the removed wristwatch and the child wearing the hidden ankle bracelet), and a video picture and description of the child is also transmitted to the law enforcement agency.

While the present invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

We claim:

1. A method to locate a person, animal, or material object, comprising:
   (a) providing in contact with the person, animal, or material object, at least a first signaling unit and a second signaling unit, said second signaling unit in communicating proximity with said first signaling unit, each said signaling units having means for identifying the location of each said signaling units and means for transmitting the location of each said signaling units when the first and second signaling units are separated more than a preselected distance;
   (b) activating said means to identify the location;
   (c) transmitting the information identifying the location of at least one of the signaling units to a monitoring station;
   (d) transmitting the information identifying the location of the at least one of the signaling units from the monitoring station to a remote receiver; and
   (e) transmitting the description of said individual, animal or material object from the monitoring station to the remote receiver.

2. The method of claim 1, including automatically activating the transmission of the location of the signaling units when said signaling units are separated by more than a preselected distance.

3. The method of claim 1, including initiating the transmission of the information identifying the location of the signaling units upon receiving instructions from a remote source.

4. The method of claim 1, including signaling the signaling units from a monitoring station to initiate the transmission of the information identifying the location of the signaling units.

5. The method of claim 1, including activating at least one of the signaling units to initiate the transmission of information identifying the location of the signaling units.

6. The method of claim 1, wherein at least one signaling unit is small, and wherein providing said signaling unit includes hiding said small unit in a wearable article.

7. The method of claim 1, including obtaining the location of the signaling units from the global positioning satellite (GPS) system.

8. The method of claim 1, including obtaining the location of the signaling units within an unlimited range from a monitoring station.

9. The method of claim 1, including operating the signaling units in a passive mode when said signaling units are in communicating proximity.

10. The method of claim 1, including continuously transmitting the information identifying the location of the signaling units.

11. The method of claim 1, including intermittenty transmitting the information identifying the location of the signaling units.

12. The method of claim 1, including transmitting in an encrypted for in the information identifying the location of the signaling units.

13. The method of claim 1, including transmitting additional information from the monitoring station to the remote receiver.

14. The method of claim 1, including transmitting the description of the individual from the monitoring station to the remote receiver.

15. The method of claim 1, including transmitting the description of the animal from the monitoring station to the remote receiver.

16. The method of claim 1, including transmitting the description of the material object from the monitoring station to the remote receiver.

17. The method of claim 1, including transmitting the information identifying the location of the signaling units from the monitoring station to the remote receiver using radio waves.

18. The method of claim 1, including transmitting the information identifying the location of the signaling units from the monitoring station to the remote receiver using the internet.

19. The method of claim 1, including transmitting the information identifying the location of the signaling units from the monitoring station to the remote receiver using a telephone network.

20. The method of claim 1, including transmitting the information identifying the location of the signaling units from the monitoring station to the remote receiver using a cellular network.

21. The method of claim 1, including transmitting the information identifying the location of the signaling units from the monitoring station to the remote receiver using low earth orbit satellites.

22. The method of claim 1, including transmitting the information identifying the location of the signaling units with an accuracy of about 100 meters.

23. The method of claim 1, including transmitting the information identifying the location of the signaling units with an accuracy of about 22 meters.

24. The method of claim 1, wherein said signaling units include means for automatically transmitting the location of each signaling unit when the signaling units are separated by more than a preselected distance.

25. The method of claim 1, wherein said signaling units include means for receiving an initiating signal for activating the transmission of information identifying the location of the signaling units.

26. The method of claim 1, wherein said signaling units include means for initiating the transmission of information identifying the location of the signaling units by at least one of the signaling units.

27. The method of claim 1, wherein at least one of the signaling units is adapted to be hidden.

28. The method of claim 1, wherein the means for identifying the location of the signaling units includes antenna means for communicating with the global positioning satellite (GPS) system.

29. The method of claim 1, wherein the means for identifying the location of the signaling units includes antenna means for communicating with low earth orbit satellites.

30. The method of claim 1, wherein the means for identifying the location of the signaling units includes antenna means for communicating with a cellular network.

31. The method of claim 1, wherein at least one signaling unit is small enough to be able to be hidden in a wearable article.

32. The method of claim 31, wherein at least one signaling unit is incorporated into at least one of an article of clothing, a shoe, a watch, a wristband, a bracelet, an identification card, an article of jewelry, a hair accessory, eyeglasses, and an animal collar.

33. The method of claim 1, wherein at least one signaling unit is securely attached to the individual.

34. The method of claim 1, wherein at least one signaling unit is securely attached to the animal.

35. The method of claim 1, wherein at least one signaling unit is securely attached to the material object.

36. The method of claim 35, wherein at least one signaling unit is incorporated into at least one of a credit card, a wallet, a cellular phone, a pager, a motor vehicle, a boat, an aircraft, a television, a radio, a stereo, a tape player, a compact disc player, a camera, a movie camera, a computer, a printer, a laptop computer, a briefcase, a suitcase, a weapon, an article of clothing, an article of jewelry, and an article of artwork.

37. The method of claim 1, wherein at least one signaling unit is incorporated into at least one of a molded article, an extruded article, and a sewn article.

38. The method of claim 1, wherein the mode of providing contact of at least one signaling unit is by means of an adhesive.

39. The method of claim 38, wherein the mode of providing contact of at least one signaling unit is by means of a pressure sensitive adhesive.

40. The method of claim 1, wherein said signaling units include means for transmitting a continuous signal.

41. The method of claim 1, wherein said signaling units include means for transmitting an intermittent signal.

42. The method of claim 1, wherein said signaling units include means for transmitting an encrypted signal.

43. The method of claim 1, using a security and tracking system comprising:
(a) a first of said signaling units having means for identifying the location of said signaling unit;
(b) a second of said signaling units in communicating proximity with the first signaling unit, said second signaling unit having means for identifying the location of said second signaling unit;and (c) the monitoring station capable of receiving information identifying the location of said signaling units.

44. The method of claim 43, wherein said monitoring station includes a means for transmitting information identifying the location of the signaling units from the monitoring station to the remote receiver.

45. The method of claim 44, wherein the location of the remote receiver is one of a law enforcement agency facility, a law enforcement vehicle, an emergency response vehicle, and an emergency care facility.

46. The method of claim 43, wherein said security and tracking system include radio wave transmitting means for transmitting the information identifying the location of the signaling units from the monitoring station to the remote receiver.

47. The method of claim 43, wherein said security and tracking system include internet connecting means for transmitting the information identifying the location of the signaling units from the monitoring station to the remote receiver.

48. The method of claim 43, wherein said security and tracking system include telephone connecting means of transmitting the information identifying the location of the signaling units from the monitoring station to the remote receiver.

49. The method of claim 43, wherein said security and tracking system include cellular communicating means for transmitting the information identifying the location of the signaling units from the monitoring station to the remote receiver.

50. The method of claim 43, wherein said security and tracking system include low earth orbit satellite communicating means for transmitting the information identifying the location of the signaling units from the monitoring station to the remote receiver.

51. The method of claim 43, wherein the means for identifying the location of the signaling units includes antenna means for communicating with the global positioning satellite (GPS) system.

52. The method of claim 43, wherein the means for identifying the location of the signaling units includes antenna means for communicating with low earth orbit satellites.

53. The method of claim 43, wherein the means for identifying the location of the signaling units includes antenna means for communicating with a cellular network.

\* \* \* \* \*